United States Patent [19]

Akiba

[11] Patent Number: 4,896,527
[45] Date of Patent: Jan. 30, 1990

[54] SOLVENT LEAK DETECTING SENSOR

[75] Inventor: Juji Akiba, Saitama, Japan

[73] Assignee: Junkosha Co., Ltd., Japan

[21] Appl. No.: 380,087

[22] Filed: Jul. 14, 1989

[30] Foreign Application Priority Data

Aug. 11, 1988 [JP] Japan .................................. 63-105379

[51] Int. Cl.⁴ ............................................. G01M 3/16
[52] U.S. Cl. ............................... 73/40.5 R; 174/11 R; 324/664; 340/605
[58] Field of Search ............ 174/11 R; 73/40, 40.5 R; 137/551; 324/65 P; 340/605

[56] References Cited

U.S. PATENT DOCUMENTS 3,600,674 8/1971 Roberts .......................... 174/11 R X
4,029,889 6/1977 Mizuochi .......................... 174/11 R
4,206,632 6/1980 Suzuki ............................... 73/40.5 R

FOREIGN PATENT DOCUMENTS 57-3166 1/1982 Japan .................................. 174/11 R
60-146127 8/1985 Japan ................................. 73/40.5 R Primary Examiner—Laramie E. Askin
Attorney, Agent, or Firm—Mortenson & Uebler

[57] ABSTRACT

A solvent leak detecting sensor is provided comprising: (a) a first electrical conductor and a second electrical conductor installed on an electrically insulating substrate in the form of a detection circuit network, the conductors being exposed and separated from each other, (b) the exposed portions of the first conductor and second conductor being covered by a layer of an electrically insulating material which is both water-repellent and which is dissolvable by the solvent that is to be detected, and (c) a top layer covering the layer in "b", this top layer being both porous and electrically conductive. The layer which is both water-repellent and which is dissolvable by the solvent that is to be detected is preferably polyvinylchloride, and the top layer is preferably conductive carbon powder.

4 Claims, 1 Drawing Sheet

SOLVENT LEAK DETECTING SENSOR

BACKGROUND OF THE INVENTION

The present invention relates to a solvent leak detecting sensor.

Water detecting sensors are the most widely known type of solvent detecting sensor. A structure which is commonly used for the detecting network in such water detecting sensors is one in which a pair of conductors, which form part of a detection circuit, are installed on an insulating substrate so that the conductors are exposed, and so that the conductors are separated from each other. In the case of water detecting sensors which use a structure of this type, an electrical change occurs in the detection circuit when the pair of conductors in the abovementioned detecting network are short-circuited by water. Accordingly, water leakage can be detected by detecting this electrical change.

However, in cases where it is desired to detect a solvent such as methyl ethyl ketone (herein, MEK), there is currently no solvent detecting sensor available which is able to detect such a solvent exclusively. Accordingly, the abovementioned water detecting sensors have been used as a substitute in order to detect such solvents. In such cases, since most solvents generally have a lower electrical conductivity than water, the water sensors must be modified so that their sensitivity is increased.

In cases where a water detecting sensor of the above type is used as a substitute in order to detect a solvent, e.g., in cases where such a sensor is used to monitor solvent leakage in a chemical plant or the like, the sensor is still primarily a water sensor. Even if there is no solvent leakage, the pair of conductors in the water detecting sensor may be short-circuited as a result of being wet by rain or other water. Thus, accurate monitoring of solvent leakage cannot be guaranteed using such a sensor.

Even if the sensitivity of a water detecting sensor is increased as described above, there are limits ot how far this sensitivity can be increased, and it is difficult to achieve a detection sensitivity which is sufficient for a reliable solvent detecting sensor.

The present invention was designed in light of the problems encountered in the known devices. An object of the present invention is to provide a solvent leak detecting sensor which is able to detect solvents as its primary detection target and which has a good detectionsensitivity.

SUMMARY OF THE INVENTION

A solvent leak detecting sensor is provided comprising: (a) a first electrical conductor and a second electrical conductor installed on an electrically insulating substrate in the form of a detection circuit network, the conductors being exposed and separated from each other, (b) the exposed portions of the first conductor and second conductor being covered by a layer of an electrically insulating material which is both water-repellent and which is dissolvable by the solvent that is to be detected, and (c) a top layer covering the layer in "b", this top layer being both porous and electrically conductive. The layer which is both water-repellent and which is dissolvable by the solvent that is to be detected is preferably polyvinylchloride, and the top layer is preferably conductive carbon powder.

BRIEF DESCRIPTION OF HTE DRAWINGS

DETAILED DESCRIPTION OF THE INVENTION AND PREFERRED EMBODIMENTS WITH REFERENCE TO THE DRAWINGS

A solvent leak detecting sensor is provided comprising: (a) a first electrical conductor and a second electrical conductor installed on an electrically insulating substrate in the form of a detection circuit network, the conductors being exposed and separated from each other, (b) the exposed portions of the first conductor and second condjctor being covered by a layer of an electrically insulating material which is both water-repellent and which is dissolvable by the solvent that is to be detected, and (c) a top layer covering the layer in "b", this top layer being both porous and electrically conductive. The layer which is both water-repellent and which is dissolvable by the solvent that is to be detected is preferably polyvinylchloride, and the top layer is preferably conductive carbon powder.

Because the mask layer, i.e., the layer dissolvable by the solvent, is water-repellent rather than hydrophilic, mere contact with water will not short-circut the first and second conductors, and the sensor will, therefore, not respond to water contact. On the other hand, when the mask layer contacts the solvent that is to be detected, the mask layer dissolves so that the first and second conductors are exposed. As a result, the first and second conductors are short-circuited by the solvent, or by the solvent and water in cases where the solvent that is to be detected is mixed with water. The conductive substance which makes up the auxiliary top layer is mixed with the liquid in the sohrt-circuited area, thus creating an environment which facilitates the passage of electric current. As a result, an electrical change occurs in the detection circuit, and the presence of the solvent can be detected by means of this electrical change.

The solvent that is to be detected can be selectively detected as the primary target of detection, with water being secondarily detected. The detection sensitivity of the device as a solvent detecting sensor is sufficiently high.

One example of application of the present invention is described below with reference to FIGS. 1 and 2.

Figure 1:
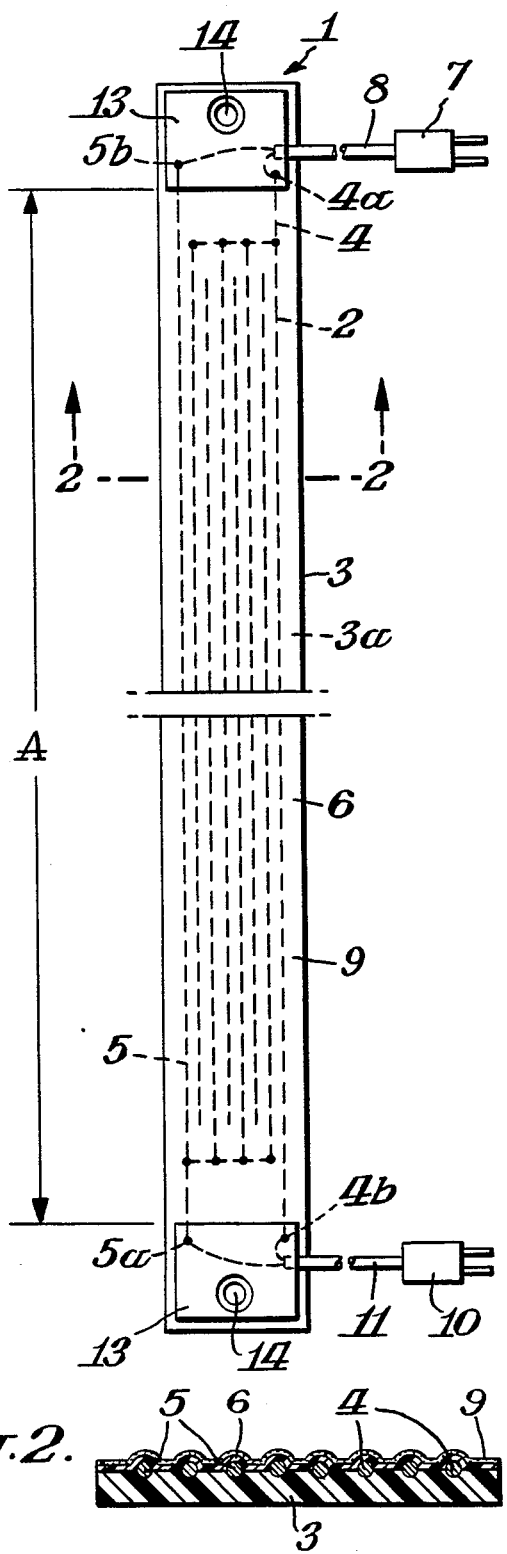
FIG. 1 is a top plan view of the solvent leak detecting sensor according to the invention.

FIG. 1 is a top plan view of a solvent detecting sensor 1. In this example, the configuration shown in one used in a case where the solvent that is to be detected is MEK.

The detecting network 2 of the solvent detecting sensor 1 has an insulating substrate 3, preferably of a glass-fiber-reinforced epoxy resin. A pattern-etched first conductor 4 and second conductor 5 are exposed on the upper surface 3a of this insulating substrate 3. The leading end 4a of the first conductor 4 is positioned at one end of the insulating substrate 3, as shown. From there, the first conductor 4 extends inearly toward the other end of the insulating substrate 3. At an intermediate point, the first conductor 4 splits intofour branches which extend parallel to each other and are separated from each other. Theend of one of these branches forms the trailing end 4b of the first conductor 4 at the other end of the insulating substrate 3. The leading end 5a of the second conductor 5 is positioned at the other end of the insulating substrate 3, as shown. From there, the second conductor 5 extends linearly toward the first end of the insulating substrate 3. This second conductor 5 similarly splits at an intermediate pint into four branches which extend parallel to each other and are separated from each other. The end of one of these branches forms the trailing end 5b of the second conductor 5 at the first end of the insulating substrate 3, and the other three branches of the second conductor 5 are positioned between the adjacent branches of the first conductor 4, so that the respective branches are separated from each other as shown. Accordingly, the first conductor 4 and the second conductor 5 are electrically insulated from each other on the surface 3a of the insulating substrate 3.

Figure 2:
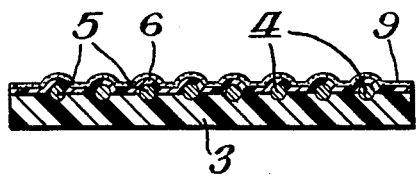
FIG. 2 is a cross-sectional view of the sensor taken along line 2—2 of FIG. 1.

In the area indicated by the arrows marked "A" in FIG. 1, the surface 3a of the insulating substrate 3 and the exposed portions of the first conductor 4 and second conductor 5 are covered by a mask layer 6 of a material which has insulating properties and water-repellent properties, and which is dissolvable by the target solvent MEK, e.g., a material such as polyvinylchloride (herein, PVC), as shown in FIG. 2. An auxiliary layer 9 consisting of electrically conductive powdered carbon is formed on the surface of the mask 6 by sprinkling the carbon powder over the PVC while it is in a tacky state. After hardening, the PVC holds the carbon powder as a porous conductor thereon.

The end of a cord 8 which extends from a connector 7 used for connection with a detector (not shown in the figures) is positioned at the first end of the surface 3a of the insulating substrate 3. The tips of a pair of lead wires which extend from this cord 8 are electrically connected with the leading end 4a of the first conductor 4 and the trialing end 5b of the second conductor 5, respectively. Similarly, the end of a cord 11, which extends from a connector 10 used for connection with a trailing-end resistor (not shown in the figures) is positioned at the other end of the surface 3a of the insulating substrate 3, and the tips of a pair of lead wires which extend from this cord 11 are electrically connected with the trailing end 4b of the first conductor 4 and the leading end 5a of the second conductor 5, respectively.

Thus, when the connector 7 is connected to a detector and the connector 10 is connected to a trailing-end resistor, a closed-loop detection circuit is formed.

Openings 14, 14, used for installation purposes, pass through the insulating substrate 3 and moldings 13, 13 are formed at both ends of the detecting part 2.

FIG. 2 shows a cross-sectional view of the sensor 1 taken along line 2—2 of FIG. 1. Therein, the substrate 3 has conductors 4 and 5 affixed thereto and covered by mask layer 6, with auxiliary top conductor layer 9 thereover.

The function of the solvent detecting sensor 1 will now be described, using as an example a case where the sensor is installed in an outdoor location for the purpose of monitoring solvent leakage.

In cases where the detecting network 2 of the solvent detecting sensor 1 is attached by a liquid, like rain water, which is inert with respect to the mask layer 6, the layer 6 does not dissolve. Because the layer 6 is water-repellent rather than hydrophilic, there is no short-circuiting of the first conductor 4 and second conductor 5 in the detecting network 2. Accordingly, no electrical change occurs in the detection circuit.

However, when the detecting network 2 is attached by the target solvent MEK, or by a liquid mixture of MEK and water, the MEK dissolves the mask layer 6, exposing the first conductor 4 and second conductor 5. Both conductors, 4, 5 are then short-circuited in the detecting network 2 by the MEK. At the same time, the powdered carbon of the auxiliary top layer 9 mixes with the MEK, or with the MEK and water, so that the short-circuited area is converted into an environment which further facilitates the passage of electric current. As a result, an electricalchange occurs very quickly in the detection circuit, an the solvent leakage can be detected quickly by means of this electrical change.

Accordingly, by using the solvent detecting sensor 1, it is possible to detect MEK selectively as the primary target of detection, and to detect the inert liquids such as water secondarily. Because the detection sensitivityis extremely high, incidents of detection failure are unlikely.

The present invention is not limited to the above example. Various other configurations may be employed. For example, thematerial used for the mask layer 6 is not limited to PVC. It would also be possible to use a paraffin-type paint. In cases where the solvent to be detected is a solvent other than MEK, a substance which is dissolvable by the solvent in question may be appropriately selected for use as the mask layer 6.

The material of the auxiliary to player 9 is not limited to powdered carbon. This layer could also be formed froma salt such as sodium chloride, or other similar material.

The insulating substrate is not limited to a substrate made of a glass fiber-reinforced epoxy resin, and the first and second conductors do not have to be formed by pattern-etching. Various design modifications are possible.

In addition, the possible uses ofthe solvent detecting sensor are not limited to leakage monitoring. The sensor can be used for various other purposes.

In the present invention, as described above, the exposed portions of a first conductor and a second conductor on an insulating substrate are covered by a mask layer made of a material which is water-repellent and is dissolvable by the solvent that is to be detected. Accordingly, the present invention has the following merit, i.e., the sensor can selectively detect the target solvent as the primary target of detection, with water being detected secondarily.

Because the auxiliary top layer is formed on the surface of the mask layer, the area that is short-circuited when solvent leakage occurs can be converted into an environment which even further facilitates the passage of electric current. Accordingly, the detection sensitivity of the solvent detecting sensor is high.

While the invention has been disclosed herein in connection with certain embodiments and detailed descriptions, it will be clear to one skilled in the art that modifications or varations of such details can be made without deviating from the gist of this invention, and such modifications or variations are considered to be within the scope of the claims hereinbelow.

What is claimed is:

1. A solvent leak detecting sensor comprising: (a) a first electrical conductor and a second electrical conductor installed on an electrically insulating substrate in the form of a detection circuit network, the conductors being exposed and separated from each other, (b) the exposed portions of said first conductor and second conductor being covered by a mask layer of an electrically insulating material which is both water-repellent and which is dissolvable by the solvent that is to be detected, and (c) a top layer covering said layer in "b", this top layer being both porous and electrically conductive.

2. The sensor of claim 1 wherein the mask layer which is both water-repellent and which is dissolvable by the solvent that is to be detected is polyvinylchloride.

3. The sensor of claim 1 wherein the mask layer which is both water-repellent and which is dissolvable by the solvent that is to be detected is a paraffin-type paint.

4. The sensor of claim 1 wherein said top layer is electrically conductive, porous carbon powder.

* * * * *

UNITED STATES PATENT AND TRADEMARK OFFICE
CERTIFICATE OF CORRECTION

PATENT NO. : 4,896,527

DATED : January 30, 1990

INVENTOR(S) : Juji Akiba

It is certified that error appears in the above-identified patent and that said Letters Patent is hereby corrected as shown below:

In col. 1, line 51, please change "tionsensitivity" to --tion sensitivity--.

In col. 2, line 1, please change "HTE" to --THE--.

In col. 2, line 39, please change "sohrt-circuited" to --short-circuited--.

In col. 2, line 62, please change "inearly" to --linearly--.

In col. 3, line 5, please change "pint" to --point--.

In col. 4, line 12, please change "an" to --and--.

In col. 4, line 17, please change "sensitivityis" to --sensitivity is--.

In col. 4, line 28, please change "to player" to --top layer--.

In col. 4, line 30, please change "froma" to --from a--.

UNITED STATES PATENT AND TRADEMARK OFFICE
CERTIFICATE OF CORRECTION

PATENT NO. : 4,896,527

DATED : January 30, 1990

INVENTOR(S) : Juji Akiba

It is certified that error appears in the above-identified patent and that said Letters Patent is hereby corrected as shown below:-

In col. 4, line 37, please change "ofthe" to --of the--.

Signed and Sealed this

Fourteenth Day of January, 1992

Attest:

HARRY F. MANBECK, JR.

*Attesting Officer*     *Commissioner of Patents and Trademarks*